United States Patent [19]

Tano et al.

[11] Patent Number: 4,558,940
[45] Date of Patent: Dec. 17, 1985

[54] MANUAL APERTURE VALUE SETTING CIRCUIT FOR CAMERA

[75] Inventors: Eiichi Tano; Takeo Kobayashi; Kiyoshi Negishi, all of Tokyo, Japan

[73] Assignee: Asaki Kogaku Kogyo Kabushiki Kaisha, Tokyo, Japan

[21] Appl. No.: 672,315

[22] Filed: Nov. 16, 1984

[30] Foreign Application Priority Data

Nov. 29, 1983 [JP] Japan .................................. 58-224700

[51] Int. Cl.[4] ............................................. G03B 7/095
[52] U.S. Cl. .................................... 354/455; 354/286; 354/289.1
[58] Field of Search ............... 354/441, 445, 446, 455, 354/289.1, 289.11, 289.12, 286

[56] References Cited

U.S. PATENT DOCUMENTS

| | | | |
|---|---|---|---|
| 4,081,813 | 3/1978 | Kawamura et al. | 354/289.1 |
| 4,089,011 | 5/1978 | Date et al. | 354/445 |
| 4,286,849 | 9/1981 | Uchidoi | 354/289.12 |
| 4,304,482 | 12/1981 | Suzuki et al. | 354/289.1 |
| 4,437,752 | 3/1984 | Akashi et al. | 354/289.12 |
| 4,455,068 | 6/1984 | Izuhara | 354/289.12 |
| 4,483,601 | 11/1984 | Sekida et al. | 354/289.1 |

*Primary Examiner*—Russell E. Adams
*Attorney, Agent, or Firm*—Sughrue, Mion, Zinn, Macpeak & Seas

[57] ABSTRACT

A manual aperture value setting circuit for a camera in which digital values corresponding to the full-aperture value and the minimum aperture value of a lens mounted on a camera are applied from the lens in digital form to a logic circuit which operates so that, with the range of aperture value set on the side of the camera being maintained in the aperture value range of the lens, the aperture value which has been set is changed to the full-aperture value or the minimum aperture value of the lens when it is out of the aperture value range of the lens.

4 Claims, 2 Drawing Figures

MANUAL APERTURE VALUE SETTING CIRCUIT FOR CAMERA

BACKGROUND OF THE INVENTION

The present invention relates to a manual aperture value setting circuit for an interchangeable lens camera.

An aperture-priority system whereby an aperture value is set by the photographer and the shutter speed is then automatically set in accordance with the chosen aperture value, the brightness of the scene being photographed and the film sensitivity has been well known for use in an interchangeable lens camera. The following aperture value setting methods in the aperture-priority system are available:

(1) First Method: A relay lever in the camera body is operated by turning the aperture ring of a lens mounted on the camera, and a resistance of a variable resistor which responds to the operation of the relay lever is electrically detected so that the set aperture value is electrically read by a circuit in the camera body.

(2) Second Method: An index mark such as "A" (representing "Automatic") is provided on the aperture ring of the lens, the operation of the aperture is controlled on the side of the camera body when the aperture ring is set to the index mark "A", and electrical data such as data in Gray code form is inputted to an arithmetic circuit by turning an aperture value disk which is graduated with aperture values.

The present invention relates specifically to an improvement of the second method of manually setting an aperture value on the side of the camera body.

In the second method, an aperture value setting member, namely, the aperture value disk, is of a mechanical construction. Therefore, the second method suffers from difficulties that it is considerably difficult to limit the range of operation of the aperture value disk (hereinafter referred to as "an aperture value range" when applicable) to a range of aperture values from the full-aperture value to the minimum aperture value of a lens mounted on the camera, and if the shutter is released with an aperture value set out of the aperture value range by mistake, exposure is carried out incorrectly. An aperture value set on the side of the camera body may be within the aperture value range of the camera until the lens is replaced by another lens. However, it may occur that, when the lens is replaced by another lens of different aperture value range, the aperture value which has been previously set is out of the aperture value range of the lens which has been newly mounted. Thus, in this case also, the same difficulty occurs.

SUMMARY OF THE INVENTION

Accordingly, an object of this invention is to overcome the above-described difficulties.

In accordance with the above and other objects, the invention provides a manual aperture value setting circuit in which digital values corresponding to the full-aperture value and the minimum aperture value of a lens to be mounted are inputted so that, with the range of aperture values set on the side of the camera body being maintained in the aperture value range of the lens to be mounted, the aperture value which has been set is changed to the full-aperture value or the minimum aperture value of the lens to be mounted when it is out of the aperture value range of the lens.

DESCRIPTION OF THE PREFERRED EMBODIMENTS

A preferred embodiment of the invention will be described with reference to the accompanying drawings.

Table 1 indicates APEX indication values $A_v$ of aperture values and bit patterns corresponding thereto, each of which consists of five bits $A_1$ through $Q_5$. In Table 1, for instance, $A_v$ 5, i.e., F5.6, corresponds to a five-bit digital value, $Q_1=1$, $Q_2=1$, $Q_3=0$, $Q_4=1$, $Q_5=0$.

TABLE 1

| $Q_5$ | $Q_4$ | $Q_3$ | $Q_2$ | $Q_1$ | AV |
|---|---|---|---|---|---|
| 0 | 0 | 0 | 1 | 0 | $\frac{1}{2}$ |
| 0 | 0 | 0 | 1 | 1 | 1 |
| 0 | 0 | 1 | 0 | 0 | $1\frac{1}{2}$ |
| 0 | 0 | 1 | 0 | 1 | 2 |
| 0 | 0 | 1 | 1 | 0 | $2\frac{1}{2}$ |
| 0 | 0 | 1 | 1 | 1 | 3 |
| 0 | 1 | 0 | 0 | 0 | $3\frac{1}{2}$ |
| 0 | 1 | 0 | 0 | 1 | 4 |
| 0 | 1 | 0 | 1 | 0 | $4\frac{1}{2}$ |
| 0 | 1 | 0 | 1 | 1 | 5 |
| 0 | 1 | 1 | 0 | 0 | $5\frac{1}{2}$ |
| 0 | 1 | 1 | 0 | 1 | 6 |
| 0 | 1 | 1 | 1 | 0 | $6\frac{1}{2}$ |
| 0 | 1 | 1 | 1 | 1 | 7 |
| 1 | 0 | 0 | 0 | 0 | $7\frac{1}{2}$ |
| 1 | 0 | 0 | 0 | 1 | 8 |
| 1 | 0 | 0 | 1 | 0 | $8\frac{1}{2}$ |
| 1 | 0 | 0 | 1 | 1 | 9 |
| 1 | 0 | 1 | 0 | 0 | $9\frac{1}{2}$ |
| 1 | 0 | 1 | 0 | 1 | 10 |
| 1 | 0 | 1 | 1 | 0 | $10\frac{1}{2}$ |
| 1 | 0 | 1 | 1 | 1 | 11 |

Figure 1:
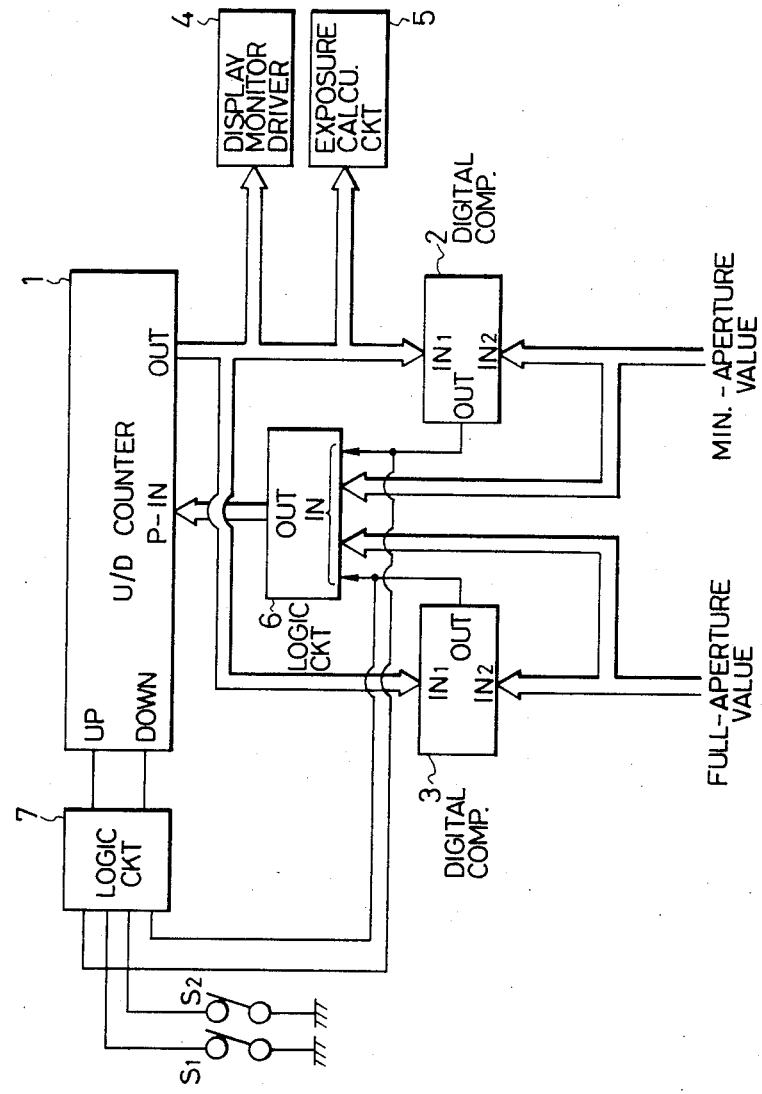
FIG. 1 is a block diagram showing a preferred embodiment of an aperture value setting circuit of the invention.

FIG. 1 is a block diagram showing a preferred embodiment of a manual aperture setting circuit of the invention. In FIG. 1, reference numeral 1 designate an up-down counter for a determining an aperture value which is manually set in a digital mode, the counter having clock pulse input terminals UP and DOWN. The counter further has a preset input terminal P-IN, and an output terminal OUT at which an output consisting of five bits $Q_1$ through $Q_5$ as shown in Table 1 is provided. The output of the counter 1 is applied to input terminals In1 of digital comparison circuits 2 and 3, and to a display monitor driver 4 and an exposure calculating circuit 5. The minimum aperture value and the full-aperture value of the lens are applied respectively to input terminals IN2 of the comparison circuits 2 and 3 in a digital mode according to Table 1. The outputs of the comparison circuits 2 and 3 and the minimum aperture value and the full-aperture value of the lens are applied to a logic circuit 6, the output of which is applied to the preset input terminal P-IN of the counter 1. The output of the comparison circuits 2 and 3 and the outputs of switches $S_1$ and $S_2$, which are, for instance, pushbutton-type switches, are applied to the clock pulse input terminals UP and DOWN of the counter 1.

The counter 1 performs a counting operation in response to a pulse applied to the input terminal UP such that a value $A_v$ in Table 1 is increased, and a counting operation in response to a pulse applied to the input terminal DOWN such that a value Av in Table is decreased.

The comparison circuits 2 and 3 are magnitude comparators. The output of the comparison circuit 2 becomes active when the content of the counter 1 is larger than or equal to the minimum aperture value of the lens (i.e., a value Av indicated by the counter 1 is larger than or equal to a value Av corresponding to the minimum aperture value). Similarly, the output of the comparison circuit 3 becomes active when the content of the counter 1 is smaller than or equal to the full-aperture value of the lens (i.e., a value Av indicated by the counter 1 is smaller than or equal to the full-aperture value).

In the described embodiment, the counter 1, the comparison circuits 2 and 3, the display monitor driver 4, and the logic circuits 6 and 7 are made up of extremely-low-power-consumption devices such as C-MOS devices so that, even if voltage is supplied thereto directly (without passing through a power switch such as a photometric switch (not shown)) from the battery (not shown) of the camera, the power consumption is not more than that corresponding to the natural discharge of the battery. Therefore, in the described embodiment, voltage is applied thereto at all times.

The operation of the preferred embodiment thus constructed will now be described.

It is assumed that the full-aperture value and the minimum aperture value of the lens are F1.4 (Av 1) and F22 (Av 9), respectively. A digital value corresponding to Av 1 in Table 1 is applied to the input IN2 of the comparison circuit 3, while a digital value corresponding to Av 9 is applied to the input IN2 of the comparison circuit 2. If the output of the counter 1 is $Q_1=1$, $Q_2=1$, $Q_3=0$, $Q_4=1$, $Q_5=0$, then Av 5, i.e., F5.6, is indicated. This output is digitally displayed by a display monitor (not shown), made up of low-power-consumption devices such as LCD devices. Therefore, the output can be ensured at all times.

The aperture value F5.6 can be changed as follows: When the switch $S_1$ is turned on once, the counter 1 counts up by an amount corresponding to one pulse. When the switch $S_1$ is turned on once again, the counter 1 counts up by the same amount again. In order to cause the counter 1 to count down, the switch $S_2$ is operated in the same manner. A new aperture value obtained in this manner can be observed on the display monitor and applied, as a manual set value, to the exposure calculating circuit 5.

When the state of $Q_1=1$, $Q_2=1$, $Q_3=0$, $Q_4=0$, $Q_5=1$, is established, i.e., Av 9(F22) is set, by operating the switch $S_1$, in the comparison circuit 2 the input to the terminal IN1 becomes equal to the input to the terminal IN2 (IN1=IN2) and the output becomes active. Even if, under the condition that the output of the comparison circuit 2 is active, the switch $S_1$ is turned on, application of the clock pulse to the counter 1 is inhibited by the logic circuit 7; that is, incrementing of the counter 1 is limited to Av 9.

When the content of the counter 1 is decreased by operating the switch $S_2$ so that $Q_1=1$, $Q_2=1$, $Q_3=0$, $Q_4=0$, $Q_5=0$, i.e., Av 1 (F1.4) is set, in the comparison circuit 3 the input to the input terminal IN1 becomes equal to that to the input terminal IN2 (IN1=IN2) and the output becomes active. Even if, under this condition, the switch $S_2$ is operated, application of the pulse to the input terminal DOWN of the counter 1 is inhibited by the logic circuit 7.

The operation when the lens is replaced by another will now be described.

It is assumed that, under the condition that a lens having a full-aperture value F1.4 and a minimum aperture value F22 is mounted on the camera, the aperture value is set to F2 by manually operating the switches $S_1$ and $S_2$.

In the case where, under this condition, the old lens is replaced by a new lens and the full-aperture value of the new lens is larger than the previously set aperture value F2 (corresponding to Av 2) in binary code in Table 1 (for instance, F2.8 or F4), the digital data inputted to the terminal IN1 of the comparison circuit is $Q_1=1$, $Q_2=0$, $Q_3=1$, $Q_4=0$, $Q_5=0$, and the digital data inputted to the terminal IN2 is $Q_1=1$, $Q_2=1$, $Q_3=1$, $Q_4=0$, $Q_5=0$ (in the case of F2.8) or $Q_1=1$, $Q_2=0$, $Q_3=0$, $Q_4=1$, $Q_5=0$ (in the case of F4), and accordingly the output of the comparison circuit 3 becomes active. Thus, the output of the comparison circuit 3 and the full-aperture value of the new lens are applied as active signals to the logic circuit 6, and the digital data $Q_1$ through $Q_5$ of the counter 1 is replaced with the digital data of the full-aperture value of the new lens.

The case where over-range occurs with the full-aperture value has been described. However, the operation in the case where it occurs with minimum aperture value is the same except that the comparison circuit 2 operates.

Figure 2:
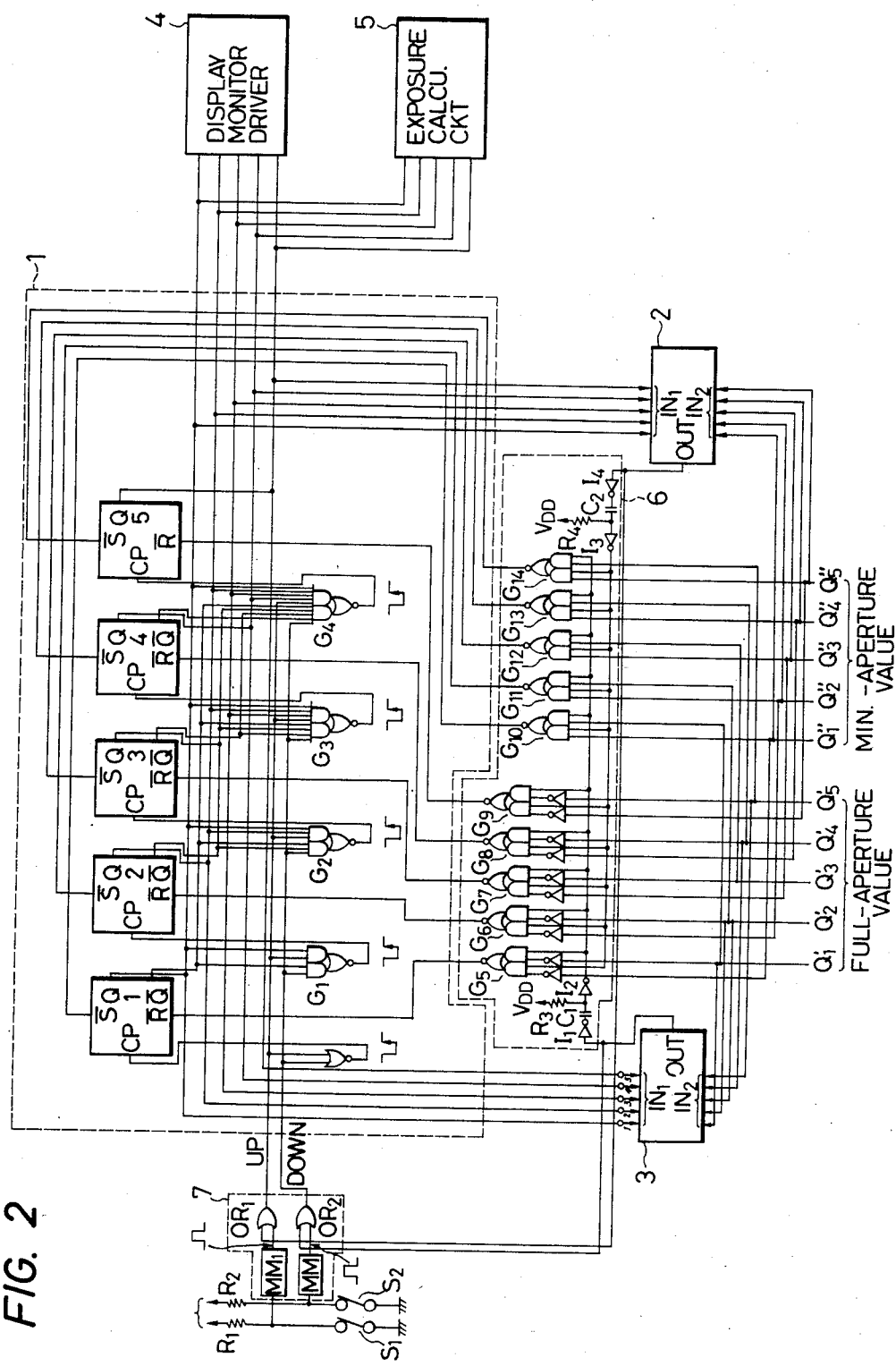
FIG. 2 is a circuit diagram of the circuit of FIG. 1.

FIG. 2 is a circuit diagram showing the counter 1 and the logic circuits 6 and 7 in more detail. The counter 1 is an up-down counter including RS flip-flops $FL_1$ through $FL_5$, each of which operates upon the rising edge of a clock pulse applied to the clock pulse terminal CP, a NOR gate $NOR_1$ and AND-NOR gates $G_1$ through $G_4$. The counter counts up according to Table 1 in response to the falling edge of a pulse applied to the input terminal UP (to increase Av) and it counts down according to Table 1 in response to the falling edge of a pulse applied to the input terminal DOWN (to decrease Av).

First, terminals of the switches $S_1$ and $S_2$ are grounded, and the remaining second terminals are connected through resistors $R_1$ and $R_2$ to a power source (not shown), and are further connected through one-shot multivibrators $MM_1$ and $MM_2$ to first input terminals of OR gates $OR_1$ and $OR_2$, respectively. The remaining second input terminals of the OR gates $OR_1$ and $OR_2$ are connected to the output terminals OUT of the comparison circuits 2 and 3, respectively. The output terminals of the OR gates $OR_1$ and $OR_2$ are connected to the input terminals UP and DOWN of the counter 1, respectively. The outputs $Q_1$ through $Q_5$ of the counter 1 are applied to the input terminals IN1 of the comparison circuits 2 and 3. The minimum aperture value data $Q_1''$ through $Q_5''$ of the lens is applied to the input terminals IN2 of the comparison circuit 2, while the full-aperture value data $Q_1'$ through $Q_5'$ of the lens is applied to the nut terminal IN2 of the comparison circuit 2. Of course $Q_1''$ through $Q_5''$, and $Q_1'$ through $Q_5'$ correspond to $Q_1$ through $Q_5$ in Table 1.

The logic circuit 6 is composed of AND-NOR gates $G_5$ through $G_9$, the output terminals of which are connected to the reset terminals $\overline{R}$ of the flip-flops $FL_1$ through $FL_5$ forming the counter 1, respectively, and AND-NOR gates $G_{10}$ through $G_{14}$, the output terminals of which are connected to the set terminals $\overline{S}$ of the flip-flops, respectively. The full-aperture value data ($Q_1'$ through $Q_5'$) is applied to the AND-NOR gates $G_5$ through $G_9$, and the output of the comparison circuit 3 is applied to the AND-NOR gates $G_5$ through $G_9$ through an inverting differentiator circuit composed of an inverter $I_1$, and a capacitor $C_1$ and a resistor $R_3$ and through a waveform shaping inverter $I_2$. On the other hand, the minimum aperture value data ($Q_1''$ through $Q_5''$) is applied to the AND-NOR gates $G_{10}$ through $G_{14}$, and the output of the comparison circuit 2 is applied to the AND-NOR gates $G_{10}$ through $G_{14}$ through an inverting differentiator circuit composed of an inverter $I_4$, a capacitor $C_2$ and a resistor $R_4$, and through a waveform shaping inverter $I_3$. The outputs of the one-shot multivibrators $MM_1$ and $MM_2$ are each changed to "1" from "0" when the switches $S_1$ and $S_2$ are closed, and restored to "0" after a predetermined time.

The operation of the circuit thus constructed will now be described.

(1) Aperture Value Setting Operation with Switches $S_1$ and $S_2$

If, when the switch $S_1$ is turned on once, the output of the comparison circuit 2 is "0" (the value Av represented by the output $Q_1$ through $Q_5$ of the counter 1 being smaller than the value Av represented by the minimum aperture value data $Q_1''$ through $Q_5''$ of the lens), the pulse output of the one-shot multivibrator $MM_1$ is applied through the OR gate $OR_1$ to the terminal UP of the counter 1, and the counter 1 counts up by a value corresponding one pulse in response at the falling edge of the pulse so that the set aperture value is increased by ½ Ev. The set aperture value is thus increased by ½ Ev in APEX value whenever the switch $S_1$ is operated. When the output of the counter 1 coincides with the minimum aperture value data ($Q_1=Q_1''$, $Q_2=Q_2''$, $Q_3=Q_3''$, $Q_4=Q_4''$, $Q_5=Q_5''$), the output of the comparison circuit 2 is raised to "1" from "0". As a result, the OR gate $OR_1$ is closed, and therefore the subsequent operation of the switch $S_1$ is invalid and thus the counter 1 ceases counting up.

Similarly, in the case of operating the switch $S_2$, if the output of the comparison circuit 3 is "0" (i.e., the value Av represented by the output $Q_1$ through $Q_5$ of the counter 1 is larger than the value Av represented by the full-aperture value data $Q_1'$ through $Q_4'$ of the lens), the content of the counter can be decreased by operating the switch $S_2$, and the set aperture value decreases by ½ Ev whenever the switch is operated. When the output of the counter 1 is decreased until it coincides with the full-aperture value data of the lens ($Q_1=Q_1'$, $Q_2=Q_2'$, $Q_3=Q_3'$, $Q_4=Q_4'$, $Q_5=Q_5'$), the output of the comparison circuit 3 is raised to "1" from "0". As a result, the OR gate $OR_2$ is closed and the subsequent operation of the switch $S_2$ is thus invalid.

The above-described operation can be summarized as follows: The aperture value can be manually set by using the output of the five-bit up-down counter. However, since the range of variation is limited between the full-aperture value and the minimum aperture value inputted from the lens mounted on the camera, the set aperture value is in the range of aperture values of the lens mounted on the camera at all times.

(2) In the Case of Lens Exchange

First, the case where over-range occurs with the full-aperture value will be described.

It is assumed that the manually set aperture value is F2 (Av 2). If, under this condition, the full-aperture value of a new lens is F4 (Av 4), then $Q_1=1$, $Q_2=0$, $Q_3=1$, $Q_4=0$, $Q_5=0$ is applied to the input terminal IN1 of the comparison circuit 3, and $Q_1'=1$, $Q_2'=0$, $Q_3'=0$, $Q_4'=0$, $Q_5'=0$ is applied to the input terminal IN2. As described before, the output of the comparison circuit 3 becomes active when IN1≦IN2. Therefore, in this case, the comparison circuit 3 provides an output signal "1". This output signal is inverted and differentiated by the inverter $I_1$, the capacitor $C_1$ and the resistor $R_3$, and is subjected to waveform shaping by the inverter $I_2$. The output of the inverter $I_2$ is applied to the right (in the drawing) AND gates of the AND-NOR gates $G_5$ through $G_{14}$. As a result, the right AND gates are opened. On the other hand, the output of the comparison circuit 2 does not become active, and the left (in the drawing) AND gates of the AND-NOR gates $G_5$ through $G_{14}$ are maintained closed. Therefore, the AND-NOR gates $G_5$ through $G_{14}$ output $G_5=Q_1'=1$, $G_6=Q_2'=0$, $G_7=Q_3'0$, $G_8=Q_4'=1$, $G_9=Q_5'=0$, $G_{10}=\overline{Q_1'}=0$, $G_{11}=\overline{Q_2'}=1$, $G_{12}=\overline{Q_3'}=1$, $G_{13}=\overline{Q_4'}=0$, and $G_{14}=\overline{Q_5'}=1$, respectively.

As described above, the output terminals of the AND-NOR gates $G_5$ through $G_9$ are connected to the reset terminals $\overline{R}$ (active=0) of the flip-flops $FL_1$ through $FL_5$, respectively, and the output terminals of the AND-NOR gates $G_{10}$ through $G_{14}$ are connected to the set terminals $\overline{S}$ (active=0) of the same flip-flops, respectively. Therefore, in this case, the flip-flops $FL_2$, $FL_3$ and $FL_5$ are reset while the flip-flops $FL_1$ and $FL_4$ are set. That is, the counter 1 provides an output $Q_1=1$, $Q_2=0$, $Q_3=0$, $Q_4=1$, $Q_5=0$; i.e., the data is converted into a digital value corresponding to the full-aperture value of the new lens.

Next, the case where over-range occurs with the minimum aperture value will be described.

It is assumed that a present aperture value is F32 (Av 10), and the minimum aperture value of a lens which is newly mounted on the camera is F22 (Av 9). In this case, the digital data $Q_1=1$, $Q_2=0$, $Q_3=1$, $Q_4=0$, $Q_5=1$ is applied to the input terminal IN1 of the comparison circuit 2, and digital data $Q_1''=1$, $Q_2''=1$, $Q_3''=0$, $Q_4''=0$, $Q_5''=1$ is applied to the input terminal IN2. Since the output of the comparison circuit 2 becomes active (raised to "1" from "0") when IN1≧IN2, the comparison circuit 2 provides an output signal "1" in this case. As in the above-described case, the output signal, after being subjected to inversion and differentiation by the inverter $I_4$, the capacitor $C_2$ and the resistor $R_4$ and to waveform shaping by the inverter $I_3$, is applied to the left AND gates of the AND-NOR gates $G_5$ through $G_{14}$ so that the left AND gates are opened. In this case, the logic circuit 3 does not become active, and therefore the right AND gates of the AND-NOR gates $G_5$ through $G_{14}$ are maintained closed. Hence, the AND-NOR gates $G_5$ through $G_{14}$ provide outputs $G_5=Q_1''=1$, $G_6Q_2''=1$, $G_7Q_3''=0$, $G_8=Q_4''=0$, $G_9=Q_5''=1$, $G_{10}=\overline{Q_1''}=0$, $G_{11}=\overline{Q_2''}=0$, $G_{12}=\overline{Q_3''}=1$, $G_{13}=\overline{Q_4''}=1$, and $G_{14}=\overline{Q_5''}=0$. Therefore, the flip-flops $FL_3$ and $FL_4$ are reset while the flip-flops $FL_1$, $FL_2$ and $FL_5$ are set; i.e., the counter 1 provides an output $Q_1=1$, $Q_2=1$, $Q_3=0$, $Q_4=0$, $Q_5=1$. That is, the data is converted into a digital value corresponding to the minimum aperture value of the new lens.

The case where over-range occurs with the full-aperture value and the minimum aperture value of a lens newly mounted on the camera have been described with reference to specific examples thereof. However, in other cases as well, when the manually set aperture value is out of the aperture value range of a lens which is newly mounted on the camera, data conversion is carried out in the same manner. That is, when over-range occurs with the full-aperture value, the output $Q_1$ through $Q_5$ of the counter is converted into a digital value $Q_1'$ through $Q_5'$ corresponding to the full-aperture value of the new lens, and when over-range occurs with the minimum aperture value, the output is converted into a digital value $Q_1''$ through $Q_5''$ corresponding to the minimum aperture value.

In the case where the set aperture value is within the aperture value range of a lens newly mounted on the camera, the outputs of the comparison circuits 2 and 3 are maintained unchanged ("0"), and therefore the states of the flip-flops $FL_1$ through $FL_5$ do not change and the output $Q_1$ through $Q_5$ of the counter 1 remains as it is.

As is apparent from the above detailed desription, according to the invention, in an aperture priority system in which an aperture value is determined on the side of the camera body, setting an aperture value erroneously out of the range of aperture values of a lens mounted on the camera is prevented, and when the set aperture value is out of the range of aperture values of a lens newly mounted on the camera, the set aperture value is suitably changed. Accordingly, erroneous setting of the aperture value and thus exposure value is prevented.

We claim:

1. A manual aperture value setting circuit for a camera, comprising:
    manual aperture value setting switches;
    a presettable counter which counts up and down in response to operation signals provided by said switches;
    comparison circuit means for comparing an output of said presettable counter with digital data corresponding to a full-aperture value and a minimum aperture value of a lens mounted on said camera;
    first logic circuit means connected between said switches and input terminals of said presettable counter for subjecting outputs of said comparison circuits and operation signals of said switches to first predetermined logical operations to control transmission of said operation signals of said switches to said presettable counter; and
    second logic circuit means having an output terminal connected to a preset input port of said presettable counter for subjecting outputs of said comparison circuits and digital data corresponding to the full-aperture value and the minimum aperture value of said lens to second predetermined logic operations.

2. The manual aperture value setting circuit of claim 1, wherein said comparison circuit means comprises first and second comparators, each of said first and second comparators having a first input port coupled to an output port of said counter, said first comparator having a second input port receiving said minimum aperture value, and said second counter having a second input port receiving said full-aperture value.

3. The manual aperture value setting circuit of claim 2, wherein said first and second logic circuit means together comprise:
    a first set of AND-NOR gates, a first set of inverters for applying said full-aperture value inverted to first inputs of said AND-NOR gates, a second set of inverters for applying said minimum aperture value to second inputs of said first set of said AND-NOR gates;
    a second set of AND-NOR gates, said second set of AND-NOR gates receiving on first inputs thereof said full-aperture value and on second inputs said minimum aperture value;
    a first differentiating and inverting circuit having an input coupled to an output of said first comparator and an output coupled to said first and second sets of said AND-NOR gates to enable said first inputs thereof; and
    a second differentiating and inverting circuit having an input coupled to an output of said second comparator and an output coupled to said first and second AND-NOR gates for enabling said second inputs thereof.

4. The manual aperture value setting circuit of claim 3, further comprising:
    first and second monostable multivibrators having input terminals coupled to respective ones of said manual aperture value setting switches; and
    first and second OR gates having first input terminals coupled to output terminals of said first and second monostable multivibrators, respectively, second input terminals coupled to outputs of said first and second comparators, respectively, and outputs coupled to UP and DOWN clock pulse input terminals, respectively, of said counter.

* * * * *